April 10, 1956 J. W. HALL 2,741,700
PIEZO-ELECTRIC CRYSTAL CONTROLLED FREQUENCY SELECTIVE APPARATUS
Filed Jan. 29, 1953
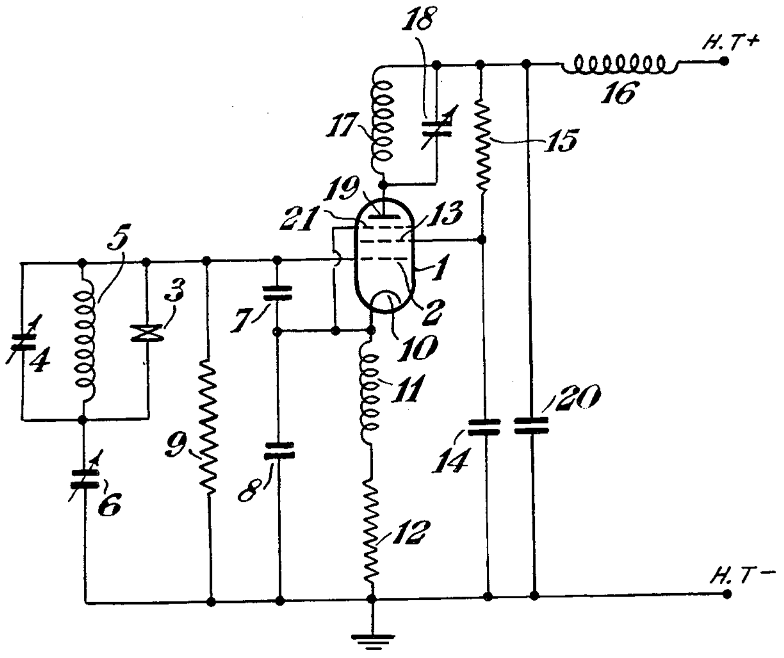
Inventor:
James William Hall;
By his attorneys,
Baldwin & Wight United States Patent Office 2,741,700
Patented Apr. 10, 1956

2,741,700

PIEZO-ELECTRIC CRYSTAL CONTROLLED FREQUENCY SELECTIVE APPARATUS

James William Hall, Brighton, England

Application January 29, 1953, Serial No. 334,038

1 Claim. (Cl. 250—36)

This invention relates to piezo-electric crystal controlled frequency selective apparatus of variable frequency and more particularly, though not exclusively, to crystal controlled oscillators.

Piezo-electric crystals are, of course, widely used for frequency determining purposes in frequency selective apparatus such as oscillators, filters, amplifiers and so forth. Known circuits employing piezo-electric crystals have, however, the defect that, in practice, they will only operate at, or very near to, the natural frequency of the crystal (or a harmonic or sub-harmonic thereof) and it has not hitherto been found possible to obtain any useful variation of the operating frequency with a given crystal.

The present invention provides improved crystal controlled variable frequency selective circuit arrangements which will permit of a useful range of frequency variation which though small as compared to that obtainable from an ordinary tuned circuit, is a good deal larger than is obtainable with crystal controlled circuits as at present known.

According to this invention a variable crystal controlled frequency selective circuit comprises a crystal in parallel with an inductance of such value as to make the parallel circuit of which it forms part resonant at a frequency below the natural frequency of said crystal and a variable condenser in series with said parallel tuned circuits and arranged to series-tune the inductance in effect constituted by said crystal.

Preferably said parallel circuit includes an additional variable condenser connected across it.

In a preferred oscillator in accordance with the invention, a parallel circuit, consisting of a crystal, an inductance and a variable condenser, is connected at one end to the grid of an oscillator valve and is connected at the other through a variable condenser to HT— and a further circuit, consisting of two series condensers with a high resistance connected across them, is provided between said grid and HT—, the junction point of the last mentioned condensers being connected to the cathode of the valve which is connected to HT— through means including a choke.

The invention is illustrated in the accompanying drawing which shows diagrammatically a preferred form of oscillator embodying the invention.

Referring to the drawing an oscillator valve 1, shown as a pentode, though any convenient suitable form of valve may be used, has its control grid 2 connected to a parallel circuit consisting of a crystal 3, a variable condenser 4, and an inductance 5 all in parallel. The inductance 5 is chosen of such value as to make the parallel circuit of which it forms part—this circuit includes, of course, the capacity of the crystal holder and stray capacity—resonant a little below the natural frequency of the crystal. This parallel circuit is connected at the end remote from the grid to one side of a small variable condenser 6 the other terminal of which is connected to HT— and earth. Two series condensers 7 and 8 are connected between the control grid 2 and HT— and are shunted by a resistance 9. The junction point of these condensers is connected to the valve cathode 10 which is connected to HT— through a high frequency choke 11 in series with a resistance 12. The screen grid 13 of the valve is connected to HT— through a by-pass condenser 14 and is also connected to HT+ through a resistance 15 in series with a second high frequency choke 16. The said choke 16 is also in the anode circuit of the valve, a parallel tuned circuit comprising an inductance 17 and a variable capacity 18 being included between the anode 19 and the choke 16. The choke side of this parallel tuned circuit is connected to HT— through a further by-pass condenser 20. The suppressor grid 21 of the pentode is connected to the cathode 10 as in the usual way.

The design details of a practically tested oscillator as above described and illustrated and designed for use with a crystal having a natural frequency of 7.0 mc./s. to give a frequency average of from 7.0 to 7.2 mc./s. will now be given by way of example only. In this oscillator condenser 4 was a variable condenser with a maximum adjusted value of .00015 mfd.; condenser 6 was a variable condenser with a maximum adjusted value of .00002 mfd.; 7 and 8 were fixed condensers of .00005 mfd. each; 5 was a fixed inductance of 8 micro-henries; resistance 9 was of value 3000 ohms; and resistance 12 was of value 1500 ohms. The value of the inductance 5 was inclined to be critical but it was found possible to increase it to 9 micro-henries without undue loss of frequency coverage.

From the theoretical point of view of the grid circuit in the above arrangement is believed to be the equivalent to two circuits. One of these consists of the crystal 3 in series with the condenser 6, these two elements being together shunted by condensers 7 and 8 in series. This is the crystal circuit proper. The other is in effect a tank circuit which is connected across the crystal and consists of the inductance 5, the capacity 4 and the capacity of the crystal holder (and any stray capacity). In the crystal circuit proper the crystal is series tuned by condenser 6. In the tank circuit condenser 4 keeps the resonance of said circuit below the crystal natural frequency; pulls the crystal back to its fundamental frequency by shunt capacity effect (this effect is very small); and, in combination with condensers 7 and 8 controls the effect produced by a variation of the capacity of condenser 6. With condenser 4 set at its smallest value, variation of condenser 6 will produce a slightly smaller frequency change than will full variation of condenser 4 with condenser 6 set at its maximum value. Large changes of value of condenser 4 can be made without much effect upon crystal frequency because this condenser is operatively associated with the inductance 5 and virtually only varies the crystal series capacity via 7 and 8.

In use, of course, the tuned circuit 17, 18 in the anode circuit of the valve is adjusted to the same frequency as that to which the crystal controlled network in the grid circuit is adjusted.

The above described circuit arrangement, dimensioned as stated, operated very efficiently with good crystal control at every frequency of adjustment, over the stated range of 7 to 7.2 mc./s., which was obtained when the variable condenser 4 was set to its minimum value.

The invention is not limited to its application to oscillators but is of general application e. g. to amplifiers and filters.

The invention is particularly suitable for use in frequency modulation systems where it may be employed to provide a simple and efficient variable frequency piezo-electrically controlled oscillator whose frequency may be varied, i. e. modulated in accordance with modulating signals. A reactance modulating valve connected in lieu of the condenser 6 enables the oscillator to be controlled over a variable frequency range.

While I have described my invention in one of its preferred embodiments I realize that modifications may be made therein and I desire that it be understood that no limitations upon my invention are intended except as may be imposed by the scope of the appended claim.

I claim:

A crystal controlled oscillator comprising a parallel circuit, consisting of a crystal, an inductance and a variable condenser, said parallel circuit being included in series with a further variable condenser in the control grid circuit of an oscillator valve, and a further circuit, consisting of two series condensers with a high resistance connected across them, in shunt across the series combination of said parallel circuit and further variable condenser, the junction point of the last mentioned condensers being connected to the cathode of the valve which is connected to HT— through means including a choke.

References Cited in the file of this patent

UNITED STATES PATENTS 2,594,091 Summerhayes ---------- Apr. 22, 1952

FOREIGN PATENTS 642,560 Great Britain ------------ Sept. 6, 1950